United States Patent
Hasegawa et al.

(10) Patent No.: US 6,755,995 B1
(45) Date of Patent: Jun. 29, 2004

(54) HALOGEN-FREE FLAME-RETARDANT RESIN COMPOSITION

(75) Inventors: Masatake Hasegawa, Mishima (JP); Hirotaka Sawada, Sakura (JP); Masakazu Ohashi, Tougane (JP); Takashi Shinmoto, Noda (JP); Kouiti Iinuma, Tokyo (JP); Takashi Edo, Tokyo (JP); Jun Suzuki, Matsudo (JP); Hiroshi Matsui, Tokyo (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 09/623,184

(22) PCT Filed: Dec. 8, 1999

(86) PCT No.: PCT/JP99/06875

§ 371 (c)(1),
(2), (4) Date: Dec. 8, 2000

(87) PCT Pub. No.: WO00/40651

PCT Pub. Date: Jul. 13, 2000

(30) Foreign Application Priority Data

Dec. 28, 1998 (JP) .......................................... 10-371953

(51) Int. Cl.⁷ ............................ C09K 21/00; C09K 3/28
(52) U.S. Cl. ................. 252/609; 106/18.11; 106/18.14; 106/18.26; 524/437
(58) Field of Search ........................ 524/437; 252/609; 106/18.11, 18.26, 18.14

(56) References Cited

FOREIGN PATENT DOCUMENTS

| JP | Hei 1-129042 | 5/1989 |
|---|---|---|
| JP | Hei 1-129048 | 5/1989 |
| JP | Hei 4-368715 | 12/1992 |
| JP | 5-262925 | 10/1993 |
| JP | Hei 5-262926 | 10/1993 |
| JP | 6-16874 | 1/1994 |
| JP | 7-33990 | 2/1995 |
| JP | Hei 7-133370 | 5/1995 |
| JP | Hei 7-276366 | 10/1995 |
| JP | 2000113737 | 4/2000 |

OTHER PUBLICATIONS

Plastic Zairyo Kouza "Polyethylene", pp. 139–141, Mar. 15, Showa 36 (1961).

"Imparting Flame Retardancy to Polymer", pp. 17–24, Apr. 10 Heisei 4 (1992).

Primary Examiner—Robert Deshon Harlan
(74) Attorney, Agent, or Firm—Chadbourne & Parke, LLP

(57) ABSTRACT

A flame-retardant resin composition, which has a high flame retardancy equivalent to that of PVCs and can be separated from PVCs by a difference in specific gravity, is obtained by adding not less than 5 parts by weight and less than 50 parts by weight of a hydrated inorganic compound and not less than 1 part by weight and not more than 55 parts by weight of an auxiliary flame retardant having an action of forming a char-like thermally insulating layer on combustion and/or an action of foaming at high temperature thereby to entrap water vapor in a polyolefine resin so that the resulting flame-retardant resin composition has a specific gravity of 1.14 or less and an oxygen index of 24 or more.

9 Claims, 1 Drawing Sheet

UNIFORM
CURRENT

HALOGEN-FREE FLAME-RETARDANT RESIN COMPOSITION

TECHNICAL FILED

The present invention relates to a flame-retardant resin composition, which has a high flame retardancy equivalent to that of a polyvinyl chloride (PVC) composition and can be used as a coating material of electrical wires, cables and analogues thereof, and which can be separated from a PVC composition as a result of having a smaller specific gravity than that of the PVC compound, and which is free from halogen and can be incinerated.

BACKGROUND ART

PVC compounds have widely been used as electrical wire coating materials, tubes, tapes, packing materials and building materials because of their good electrical insulating properties and self-extinguishing flame retardancy.

However, since PVC compounds contains chlorine (Cl) as a halogen, corrosive gases such as HCl and a toxic gases such as dioxin are evolved on combustion. Therefore, there is the problem that wastes of various PVC products cannot be incinerated and, at present, PVC products are buried. However, since a Pb-based stabilizer is used as an additive in PVC compounds, the stabilizer is eluted into the soil, thereby making it difficult to treat PVC products as industrial waste.

When halogen-free polyethylene (PE) and polypropylene (PP) are used as resin compositions in place of PVC, they can be incinerated because no harmful gas is evolved on combustion. However, these halogen-free resin compositions have the drawbacks that the flame retardancy is inferior to PVC. Comparing the oxygen indexes (OI) of the compounds as a measure for evaluation of the resin composition, the OI of PVC is from 23 to 40, whereas the OI of PE and PP is inferior, roughly 17 to 19.

To impart the flame retardancy to a halogen-free resin composition such as PE and PP, a hydrated inorganic compound such as $Mg(OH)_2$ is added. However, the specific gravity of the hydrated inorganic compound is large and 120 parts by weight or more of the hydrated inorganic compound must be added to obtain the flame retardancy equivalent to that of PVC, so that the specific gravity of the flame-retardant resin composition obtained by adding the hydrated inorganic compound is about equivalent to that of PVC. Therefore, there is the problem that such a plastic cannot be separated using a difference in specific gravity by using water as a standard liquid.

"The recovered plastic is put into water flowing uniformly and then separated due to a difference in specific gravity in order to recycle or remove PVCs, which evolve dioxin, before incineration. As shown in FIG. 1, reference numeral 1 denotes olefin plastic particles such as PP and PE, which float on water because their specific gravity (about 0.9 g/cm$^3$) is lower than that of water, whereas PVCs, denoted by the reference numeral 2 in FIG. 1, have a higher specific gravity (about 1.3 g/cm$^3$) than that of water and sink in water. Styrene plastics denoted by the reference numeral 3, also sink in water because their specific gravity is about 1.2 g/cm$^3$. Since there are small differences in their densities between the PVCs and styrene plastics, PVCs and styrene plastics can be separated by flowing water as a uniform current, so that these plastics collect at different locations. Accordingly, the above three kinds of plastic can be separated by making use of these characteristics. However, there is the drawback that the above mentioned halogen-free flame-retardant resin composition and PVC cannot be separated because their specific gravities are about identical."

An object of the present invention is to provide a resin composition which has a flame retardancy equivalent to that of PVC and evolves no harmful gas on incineration, and which can be separated from PVC due to a difference in specific gravity.

DISCLOSURE OF THE INVENTION

The halogen-free flame-retardant resin composition of the present invention is prepared by adding not less than 5 parts by weight and less than 50 parts by weight of a hydrated inorganic compound and not less than 1 part by weight and not more than 55 parts by weight of an auxiliary flame retardant having an action of forming a char-like thermally insulating layer on combustion and/or an action of foaming at high temperature thereby to entrap water vapor in a polyolefine resin so that the resulting flame-retardant resin composition has a specific gravity of 1.14 or less and an oxygen index of 24 or more.

According to the present invention, a preferable flame retardancy and low specific gravity can be attained at the same time by using the hydrated inorganic compound in combination with the auxiliary flame retardant having the above actions to obtain a synergistic effect. When the specific gravity of the halogen-free frame-retardant resin composition is 1.14 or less, it is possible to fractionate it from PVC due to the difference in specific gravity. When the OI of the halogen-free frame-retardant resin composition is 24 or more, it has a flame retardancy identical to that of PVC.

BEST MODE FOR CARRYING OUT THE INVENTION

Figure 1:
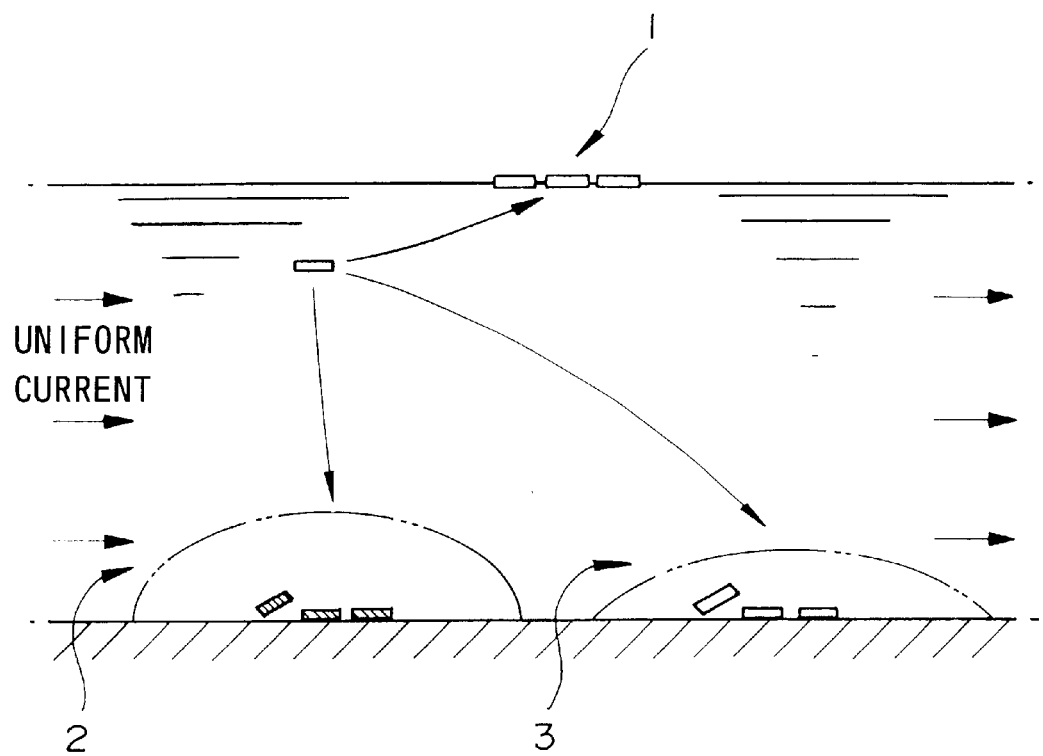
FIG. 1 is a diagram for explaining the sedimentation loci of plastics in a water current.

Preferable polyolefine resins used in the present invention include, for example, polyethylene (PE) (e.g. linear low-density polyethylene (LLDPE), very low-density polyethylene (VLDPE), low-density polyethylene (LDPE), medium-density polyethylene (MDPE) and high-densitypolyethylene (HDPE)), polypropylene (PP), ethylene-vinyl acetate copolymer (EVA), ethylene-ethyl acrylate copolymer (EEA), ethylene-butyl acrylate copolymer (EBA), ethylene-propylene rubber (EPR), rubber (EPR), ethylene-(meth) acrylate copolymers and olefin copolymers. It is also possible to use an acid-modified polyolefine modified by reacting with an unsaturated carboxylic acid such as maleic anhydride and acrylate or a derivative thereof on or after polymerization of the polyolefine resin.

These resins may be used alone or in combination. The ethylene-vinyl acetate copolymer (EVA) and ethylene-ethyl acrylate copolymer (EEA) are particularly preferred because the flame retardancy of the resin itself is comparatively high. The resins are preferably used alone, or EVA and EEA are used after mixing them, or EVA and/or EEA are preferably used after mixing with the other resin in a proper ratio. Since EPR is superior in electrical insulating properties and pliability, EVA and/or EEA and EPR are used more preferably after mixing them. For example, when using EVA and EPR after mixing, the amount of EVA is preferably from 80 to 40 (% by weight) and the amount of EPR is preferably from 20 to 60 (% by weight).

When using EVA and EEA, the content of the monomer (VA, EA) used in the copolymerization with ethylene is preferably from 15 to 40% by weight. When the content of the monomer is smaller than the above range, the flame retardancy is poor. On the other hand, when it is larger than the above range, pellets adhere to each other because of stickiness (adhesion) and the workability on extrusion is lowered, which is not preferred.

The hydrated inorganic compounds used in the present invention may be those which are decomposed into an oxide and water vapor on combustion, thereby to develop flame retardancy, and there can be used, for example, magnesium hydroxide ($Mg(OH)_2$) and aluminum hydroxide. Particularly, magnesium hydroxide is preferred. It is preferred that the affinity with the resin and thermal decomposition characteristics are improved by a surface treatment of magnesium hydroxide using stearic acid, an oxalic anion and a silane coupling agent. Magnesium hydroxide and aluminum hydroxide may be used in combination.

When the hydrated inorganic compound (e.g. $Mg(OH)_2$) is added to the polyolefine resin, the temperature is lowered by decomposing the hydrated inorganic compound into an oxide and water vapor on combustion and, at the same time, supply of oxygen to the portion combusting by water vapor evolved is inhibited. It is possible to prevent the spread of the fire to other portions of the resin surface. The prevention of the spread of the fire is caused by the adhesion of the oxide to the combusted portion.

The amount of the hydrated inorganic compound is not less than 5 parts by weight and less than 50 parts by weight, preferably not less than 20 parts by weight and less than 50 parts by weight, and more preferably not less than 30 parts by weight and less than 50 parts by weight, based on 100 parts by weight of the polyolefine resin. When the amount of the hydrated inorganic compound is too small, the preferable flame retardancy is not obtained. On the other hand, when the amount is too large, the specific gravity of the halogen-free flame-retardant resin composition becomes too large, thereby making it impossible to separate it from PVCs using a difference in specific gravity.

When using a coated molybdenum compound as the hydrated inorganic compound, the flame retardance is effectively improved, thereby making it possible to decrease the specific gravity of the flame-retardant resin composition by reducing the amount of the hydrated inorganic compound. The molybdenum compound used for coating includes, for example, molybdenum oxides such as molybdenum trioxide; molybdenum sulfides such as molybdenum disulfide; and molybdates such as ammonium dimolybdate, calcium molybdate, zinc molybdate, potassium molybdate and sodium molybdate.

When using the hydrated inorganic compounds prepared by treating aluminum hydroxide, calcium carbonate or magnesium hydroxide with ammonium molybdate, good results are obtained. When using a hydrated inorganic compound treated with a molybdenum compound, a preferable flame-retardant resin composition can be obtained by adding the treated compound in an amount ranging not less than 5 parts by weight and less than 40 parts by weight based on 100 parts by weight of the polyolefine resin.

In the present invention, the auxiliary flame retardant used in combination with the hydrated inorganic compound includes those which exert an action of forming a char-like thermally insulating layer at high temperature (500° C. or higher) on combustion or an action of strongly foaming at high temperature (400° C.) thereby to entrap water vapor therein, or which simultaneously exerts both these actions.

By using an auxiliary flame retardant having these actions in combination with the hydrated inorganic compound, the flame retardancy of the resin composition is effectively improved by a synergistic effect of both, thereby making it possible to simultaneously attain high flame retardancy and low specific gravity. The flame retardant may be organic or inorganic, and is preferably one which exerts a synergistic effect with the hydrated inorganic compound by adding only a small amount thereof, thus contributing to an improvement in flame retardancy.

To obtain a flame-retardant resin composition having a low specific gravity, the auxiliary flame retardant in the present invention may be preferably one having a small density, and specifically those having a density of less than 1.5 g/cm$^3$. The auxiliary flame-retardant may be preferably be one free from a heavy metal such as Pb.

When the amount of the auxiliary flame-retardant in the present invention is too small, a preferable flame retardancy is not obtained. On the other hand, when the amount is too large, the specific gravity of the halogen-free flame-retardant resin composition becomes too large, thereby making it impossible to separate it from PVCs using a difference in specific gravity. Therefore, when the auxiliary flame-retardant is used in combination with the hydrated inorganic compound not less than 1 part by weight and not more than 55 parts by weight based on 100 parts by weight of the polyolefine resin, the conditions of the desired specific gravity and flame retardancy can be satisfied simultaneously.

The auxiliary flame-retardant in the present invention is preferably red phosphorous and carbon black. Since both red phosphorous and carbon black have a comparatively small density and serve as an auxiliary crosslinking agent to form a char-like thermally insulating layer at high temperatures (500° C. or higher) on combustion when used in combination with magnesium hydroxide, red phosphorous and carbon black contribute to an improvement in flame retardancy by adding only a small amount of them. It is more effective to use red phosphorous and carbon black in combination.

Alternatively, when using magnesium hydroxide as the hydrated inorganic compound, N,N'-m-phenylenedimaleimide can be preferably used as the auxiliary flame retardant. Since N,N'-m-phenylenedimaleimide has a comparatively small density and serves as an auxiliary crosslinking agent to form a char-like thermally insulating layer at high temperature (500° C. or higher) on combustion when used in combination with magnesium hydroxide, it contribute to an improvement in flame retardancy by adding only a small amount thereof. In the present invention, the auxiliary flame retardant is preferably free from heavy metals such as Pb.

Specifically, when using red phosphorous and carbon black in combination as the auxiliary flame retardant, the amount of the hydrated inorganic compound is preferably not less than 20 parts by weight and less than 50 parts by weight, the amount of red phosphorous is preferably not less than 0.5 parts by weight and less than 2.5 parts by weight, and the amount of carbon black is preferably not less than 1 part by weight and less than 6 parts by weight, based on 100 parts by weight of the polyolefine resin.

When magnesium hydroxide is used as the flame retardant and N,N'-m-phenylenedimaleimide is used as the auxiliary flame retardant, the amount of the hydrated inorganic compound is preferably not less than 20 parts by weight and less than 50 parts by weight, and the amount of N,N'-m-phenylenedimaleimide is preferably not less than 1 part by weight and not more than 5 parts by weight, based on 100 parts by weight of the polyolefine resin.

Other examples of the auxiliary flame retardant in the present invention include a silicone compound. Preferred examples of the silicone compound include gummy silicone oil and silicone powder. The silicone powder is an organosiloxane polymer and has a methyl group and a phenyl group. The gummy silicone oil is a high viscosity oil having a molecular weight of about 300,000 to 1,000,000.

These silicone compounds form a char-like thermally insulating layer on combustion, thereby contributing to an improvement in flame retardancy when used in combination with the hydrated inorganic compound. Since the gummy silicone oil and silicone powder have a smaller density than that of the hydrated inorganic compound, a low specific density and high flame retardancy of the resin composition can be simultaneously realized by adding the gummy silicone oil and/or silicone powder in place of reducing the amount of the hydrated inorganic compound.

Since the gummy silicone has a lower specific gravity than that of the silicone powder, the amount of the hydrated inorganic compound can be increased by using the gummy silicone. Therefore, it is effective to obtain a resin composition having low specific gravity and high flame retardancy. On the other hand, the silicone powder is advantageous in the respect that the kneading time can be shortened because the silicone powder can be dispersed in the other powder material in advance, that is, it can be easily dispersed in the resin as compared with the gummy silicone oil.

When using the gummy silicone oil as the auxiliary flame retardant, a preferable amount is not less than 1 part by weight and not more than 40 parts by weight based on 100 parts by weight of the polyolefine resin. When using the silicone powder, a preferable amount is not less than 3 parts by weight and not more than 55 parts by weight based on 100 parts by weight of the polyolefine resin. The gummy silicone oil and/or silicone powder can be used in combination and are added in a total amount of 1 to 55 parts by weight. When the amount of the gummy silicone oil and silicone powder is too small, the effect of increasing the flame retardancy is not obtained. Even if they are added in the amount larger than the above range, the cost for raw materials will increase but no improvement in flame retardancy can be expected.

Besides the gummy silicone oil and/or silicone powder, for example, a silicone-modified polymer can also be used as the auxiliary flame retardant. It is considered that the silicon-modified polymer also forms a char-like thermally insulating layer on combustion, and it contributes to an improvement in flame retardancy when used in combination with the hydrated inorganic compound. Specific examples thereof include silicone-modified polyethylene, silicone-modified ethylene-vinyl acetate copolymer, silicone-modified ethylene-ethyl acetate copolymer and silicone-modified ethylene-methyl methacetate copolymer.

A preferable amount of the silicone-modified polymer is not less than 3 parts by weight and not more than 30 parts by weight, and particularly preferably not less than 5 parts by weight and not more than 20 parts by weight, based on 100 parts by weight of the polyolefine resin. When the amount of the silicone-modified polymer is too small, the effect of increasing the flame retardancy is not obtained. Even if the silicone-modified polymer is added in an amount larger than the above range, the cost for raw materials will increase but no improvement in flame retardancy can be expected.

In addition to the auxiliary flame retardant, a molybdenum compound may also be added. It is considered that the molybdenum compound serves as a catalyst for accelerating the formation of a char by the auxiliary flame retardant, and it is effective to attain a high flame retardancy. Specific examples of thereof include molybdenum oxides such as molybdenum trioxide; molybdenum sulfides such as molybdenum disulfide; and molybdates such as ammonium dimolybdate, calcium molybdate, zinc molybdate, potassium molybdate and sodium molybdate. These molybdenum compounds may be used alone or in combination. When the amount of the molybdenum compound is too small, the effect of increasing the flame retardancy is not obtained. If the molybdenum compound is added in the amount larger than the above range, the cost for raw materials will increase and the specific gravity will also increase. Therefore, the amount is preferably not less than 5 parts by weight and not more than 20 parts by weight.

When using in combination with the hydrated inorganic compound, examples of the auxiliary flame retardant having an action of foaming thereby to entrap water vapor include zinc methacrylate, which can also be used as the auxiliary flame retardant in the present invention.

It is preferred to further add an antioxidant to the halogen-free flame-retardant resin composition of the present invention. The antioxidant is not specifically limited, but phenol- and amine-based antioxidants can be used. When the amount of the antioxidant is too small, the addition effect is not obtained. On the other hand, when the amount is too large, blooming and bleeding occur sometimes. Therefore, the amount is preferably not less than 0.1 parts by weight and not more than 2.0 parts by weight based on 100 parts by weight of the polyolefine resin.

In addition to the above additives, for example, appropriate additives such as ultraviolet absorbers, crosslinking agents, copper inhibitors, pigments, dyes, colorants, and fine powders of inorganic matter such as talc can be incorporated according to the intended use. As the additive, those free from halogen, and particularly free from lead (Pb), can be selected. Those containing the smallest possible amounts of harmful heavy metals such as cadmium (Cd) are preferred. The content of the heavy metal in the halogen-free flame-retardant resin composition is preferably reduced to less than 0.1% by weight.

The halogen-free flame-retardant resin composition of the present invention may be crosslinked. The crosslinking method includes, for example, a method of adding 0.5 to 2.0% by weight of an organic peroxide such as dicumyl peroxide (DCP) to a flame-retardant resin composition, followed by molding and heating, a method of molding a flame-retardant resin composition, followed by irradiation with electron beams, gamma ($\gamma$) rays, and so on, and a method of adding a silane compound such as vinyltrimethoxysilane and an organic peroxide such as DCP to a flame-retardant resin composition, kneading and molding the mixture, and crosslinking (silane crosslinking) by contacting with water.

According to the halogen-free flame-retardant resin composition of the present invention, there can be obtained a resin composition which has an oxygen index of 24 or more and a self-extinguishing flame retardancy equivalent to that of PVC. The halogen-free flame-retardant resin composition of the present invention is burned very little in the case of a fire and evolves little smoke. Since the halogen-free flame-retardant resin composition is free from halogens, toxic gases such as dioxin and halogen gases are not evolved on combustion. Therefore, the halogen-free flame-retardant resin composition can be incinerated and evolves no toxic gas on combustion. The halogen-free flame-retardant resin composition can be easily separated from PVCs due to a difference in specific gravity by using flowing water as a standard liquid because its specific gravity is smaller than that of PVC. Accordingly, the halogen-free flame-retardant resin composition can be recycled by fractionation and recovery, thereby making it possible to recover heat if it is used as a fuel or to reuse it as a material. Furthermore, the halogen-free flame-retardant resin composition can be buried because lead is not eluted.

The weathering resistance of the resin is improved by adding carbon black or a silicone compound as the auxiliary flame retardant. Since the addition of the silicone compound can improve the weathering resistance and does not cause deep coloration of the resin, a resin composition having good coloring property can be obtained.

The halogen-free flame-retardant resin composition of the present invention is suited for use as an insulating material for various electrical wires and cables, such as insulating electrical wire, electrical wire for wiring of electronic equipment, electrical wire for automobiles, electrical wire for equipment, power cord, insulating electrical wire for outside wiring, electrical wire for power, control cable, telecommunication cable, instrumentation cable, signal cable, moving cable and marine cable; accessory parts for electrical wire and cable (specifically, shrink tube, rubber stress relief corn, etc.) such as sheath material, tapes, inclusion, cases, plugs and tapes; electric material products such as conduit tube, wiring duct and bath duct; and agricultural sheet, water hoses, gas tube coating materials, building interior materials, furnishing materials, toy materials and floor materials.

When using the halogen-free flame-retardant resin composition of the present invention as an electrical wire and a power cord, a product having excellent pliability, good plug bending characteristics and excellent tracking resistance of the plug portion can be obtained.

The flame-retardant electrical wire/cable of the present invention is obtained by using the flame-retardant resin composition as a sheath material, an insulator material, or an inclusion material on a stranded core wire, and its structure is appropriately designed according to the intended use. In general, there are many cables wherein only a sheath is formed of a flame-retardant resin composition. If necessary, the flame-retardant resin composition can be colored by incorporating a pigment and the insulator and sheath may be formed of the colored resin layer.

The flame-retardant electrical wire/cable or analogue thereof of the present invention is obtained by applying the flame-retardant resin composition as a coating material for the electrical wire, cable or analogue thereof (e.g. conduit tube, pipe, tube, tape, etc.) and can attain a sufficiently high flame retardancy to pass at least one of a 60° inclined combustion test defined in the Japanese Law for Control of Electrical Appliances, a vertical combustion test defined in the UL standard, a vertical tray combustion test defined in IEEE Standard 383 and a vertical tray combustion test defined in IEC standard 332-1. According to the present invention, there can be obtained an electrical wire/cable which passes both combustion tests defined in the Law for Control of Electrical Appliances and IEEE Standard 383 preferably, or passes the three combustion tests defined in the Law for Control of Electrical Appliances, IEC Standard 332-1 and IEEE Standard 383, and passes the four combustion tests defined in the Law for Control of Electrical Appliances, the UL standard, IEC Standard 332-1 and IEEE Standard 383 more preferably.

The oxygen index method is an effective method to compare and evaluate the flame retardances of the resin compositions as the materials, whereas, the above combustion tests are methods for evaluating the flame retardancy when the resin composition is applied to a coated layer of an electrical wire, cable or analogue thereof, and is important to evaluate the practicability of the flame-retardant resin composition.

According to the intended use of the electrical wire/cable of the present invention, foaming may be caused on production of the electrical wire/cable by adding in advance an appropriate foaming agent to the flame-retardant resin composition. In this case, the degree of foaming is preferably 10% or less.

When an insulator is formed of the flame-retardant resin composition, the volume resistivity is preferably controlled to $1 \times 10^{13}$ ($\Omega \cdot cm$).

According to the present invention, a practicable flame-retardant electrical wire/cable with an insulator and/or sheath having excellent self-extinguishing flame retardancy can be obtained. The flame-retardant electrical wire/cable of the present invention is burned very little in case of a fire and evolves less smoke. Since the insulator material and sheath material is free from halogen, toxic gases such as dioxin and halogen gas are not evolved on combustion. Therefore, the flame-retardant electrical wire/cable can be incinerated and evolves no toxic gases on combustion.

EXAMPLES

The effects of the present invention will be made clear by way of the following specific examples. In accordance with the formulations (units: parts by weight) shown in Tables 1 to 3 below, various components were incorporated and kneaded using a kneader to obtain a resin composition. In Example 11, 1 part of DCP was added as a crosslinking agent. In Example 12, 0.1 parts of DCP and 1.8 parts by weight of vinyltrimethoxysilane were added as a crosslinking agent.

To carry out the combustion test, a conductor of 2 mm$^2$ was coated with a resin composition after kneading with a thickness of 0.8 mm by extruding the resin composition to produce an electrical wire. After coating with the resin composition, the resin composition was crosslinked by subjecting it to a heat treatment or a hot water dipping treatment in Examples 11 and 12. Using the resulting electrical wire, combustion tests were carried out in accordance with each of a 60° inclined combustion test defined in the Law for Control of Electrical Appliances, a vertical combustion test defined in UL Standard VW-1, and a vertical tray combustion test defined in IEC Standard 332-1 and IEEE Standard 383. Passing the combustion test is represented by the symbol "○", and failing the test is represented by the symbol "X".

The oxygen index (OI) in accordance with the test method defined in JIS K7201, the tensile strength and elongation in accordance with the method defined in JIS K7113, and the specific gravity of the resin composition were measured. The results are shown in the tables below. With respect to the evaluation of the tensile strength, a tensile strength of 1 kgf/mm$^2$ or more is rated as "OK", while a tensile strength of 1 kgf/mm$^2$ or less is rated as "NG". With respect to the evaluation of the elongation, an elongation of 250% or more is rated as "OK", while an elongation of 150% or less is rated as "NG".

TABLE 1

| Examples | | 1 | 2 | 3 | 4 | 5 | 6 | 7 | 8 | 9 | 10 | 11 | 12 |
|---|---|---|---|---|---|---|---|---|---|---|---|---|---|
| EVA | | 100 | 100 | 100 | 100 | 100 | 100 | 100 | 100 | 50 | 50 | 70 | 60 |
| EEA | | | | | | | | | | 50 | 50 | | |
| EPR | | | | | | | | | | | | 30 | 40 |
| Silicone powder | | 30 | 3 | 55 | 10 | 45 | — | 10 | — | 10 | 10 | 5 | 5 |
| Silicone gum | | — | 10 | — | 1 | 10 | 1 | 20 | 40 | — | — | 5 | 5 |
| Surface-treated magnesium hydroxide | | 5 | 20 | 40 | 35 | 40 | 35 | 49 | 20 | 30 | 45 | 40 | 40 |
| Molybdenum compound | | — | 20 | 5 | 10 | 5 | 10 | — | 20 | — | — | 8 | 5 |
| Antioxidant | | 0.5 | 0.5 | 0.5 | 0.5 | 0.5 | 0.5 | 0.5 | 0.5 | 0.5 | 0.5 | 0.5 | 0.5 |
| Combustion test | 60° inclined method | ○ | ○ | ○ | ○ | ○ | ○ | ○ | ○ | ○ | ○ | ○ | ○ |
| | VW-1 | x | x | x | x | ○ | x | x | x | x | ○ | ○ | ○ |
| | IEC332-1 | x | ○ | ○ | ○ | ○ | ○ | ○ | ○ | ○ | ○ | ○ | x |
| | IEEE383 | ○ | ○ | ○ | ○ | ○ | ○ | ○ | ○ | ○ | ○ | ○ | ○ |
| OI | | 28 | 32 | 41 | 33 | 40 | 33 | 42 | 40 | 38 | 33 | 32 | 35 |
| Tensile strength | | OK | OK | OK | OK | OK | OK | OK | OK | OK | OK | OK | OK |
| Elongation | | OK | OK | OK | OK | OK | OK | OK | OK | OK | OK | OK | OK |
| Specific gravity | | <1.14 | <1.14 | <1.14 | <1.14 | <1.14 | <1.14 | <1.14 | <1.14 | <1.14 | <1.14 | <1.14 | <1.14 |

TABLE 2

| Comparative Examples | | 1 | 2 | 3 | 4 | 5 | 6 | 7 |
|---|---|---|---|---|---|---|---|---|
| EVA | | 100 | 100 | 100 | 100 | 100 | 100 | 100 |
| EEA | | | | | | | | |
| EPR | | | | | | | | |
| Silicone powder | | 0.5 | 0.5 | — | 60 | 15 | 10 | 10 |
| Silicone gum | | 0.5 | — | 0.5 | — | 45 | 45 | 45 |
| Surface-treated magnesium hydroxide | | 55 | 55 | 55 | 48 | 45 | 3 | 1 |
| Molybdenum compound | | — | — | — | — | — | — | — |
| Antioxidant | | 0.5 | 0.5 | 0.5 | 0.5 | 0.5 | 0.5 | 2.5 |
| Combustion test | 60° C. inclined method | ○ | ○ | ○ | ○ | ○ | X | X |
| | VW-1 | X | X | X | ○ | ○ | X | X |
| | IEC332-1 | ○ | ○ | ○ | ○ | ○ | X | X |
| | IEEE383 | ○ | ○ | ○ | ○ | ○ | X | X |
| OI | | 38 | 36 | 36 | 40 | 39 | 23 | 22 |
| Tensile strength | | OK | OK | OK | OK | OK | NG | NG |
| Elongation | | OK | OK | OK | OK | OK | OK | OK |
| Specific gravity | | >1.15 | >1.15 | >1.15 | <1.14 | <1.14 | <1.14 | <1.14 |
| Remarks | | | Large specific gravity | | Poor processability, high cost | | Poor flame retardancy, blooming occurred | |

TABLE 3

| | | Examples | | | | | Comparative Examples | | |
|---|---|---|---|---|---|---|---|---|---|
| | | 13 | 14 | 15 | 16 | 17 | 8 | 9 | 10 |
| EEA | | 70 | 100 | 100 | 100 | 80 | 100 | 100 | 70 |
| Olefin copolymer | | 30 | | | | 20 | | | 30 |
| Magnesium hydroxide | | 20 | 25 | 30 | 45 | 45 | 50 | 15 | 50 |
| Red phosphorous | | 2 | 1 | 1 | 0.75 | 0.9 | 2 | 2 | 0.1 |
| Carbon black | | 5 | 4 | 4 | 2 | 2 | 5 | 5 | 5 |
| HVA-2 | | | 2 | | | | | | |
| Antioxidant | | 0.5 | 0.5 | 0.5 | 0.5 | 0.5 | 0.5 | 0.5 | 0.5 |
| Combustion test | 60° inclined method | ○ | ○ | ○ | ○ | ○ | ○ | X | ○ |
| | VM-1 | X | X | X | ○ | ○ | X | X | X |
| | IEC332-1 | X | X | X | ○ | ○ | X | X | X |
| | IEEE383 | X | X | X | ○ | ○ | X | X | X |
| OI | | 29 | 32 | 30 | 33 | 34 | 34.5 | 27 | 28 |
| Tensile strength | | OK | OK | OK | OK | OK | OK | OK | OK |
| Elongation | | OK | OK | OK | OK | OK | OK | OK | OK |
| Specific gravity | | 1.11 | 1.11 | 1.11 | 1.13 | 1.14 | 1.17 | 1.05 | 1.15 |

The specific respective resins and formulations thereof described in the above tables are as follows.

EVA: ethylene-vinyl acetate copolymer having a melt flow rate (hereinafter abbreviated to MFR) of 2.5 and a vinyl acetate content of 19%

EEA: ethylene-ethyl acetate copolymer having an MFR of 0.5 and an ethyl acrylate content of 20%

EPR: ethylene-propylene rubber, EPT #3045 manufactured by Mitsui Chemicals Co., Ltd.

Olefin copolymer: Mooney viscosity of ML1+4 (100° C.) 40, ethylene content of 70% by mole, propylene content of 30% by mole Surface-treated magnesium hydroxide: magnesium hydroxide surface-treated with stearic acid, density of 2.36 g/cm$^3$ Molybdenum compound: Bohen 803 manufactured by Kikuchi Color Co., Ltd.

Silicone gum: gummy silicone oil manufactured by Shinetsu Silicone Co., Ltd., density of 0.985 g/cm$^3$ Silicone powder: DC 4-7081 manufactured by Toray Dow Corning Co., Ltd., density of 1.20 g/cm$^3$ HVA-2: N,N'-m-phenylene dimaleimide manufactured by Du Pont Co.

Antioxidant: Irganox 1010 manufactured by Ciba Geigy Co.

Industrial applicability

The flame-retardant composition of the present invention has a high flame retardancy equivalent to that of PVC and can be recovered by separation from PVC using a difference in specific gravity, because its specific gravity is 1.14 or less, and can be incinerated because it is free of halogens. Therefore, the flame-retardant composition of the present invention is environmentally friendly. This halogen-free flame-retardant composition is preferably used as a coating material for electrical wires and cables or inclusion materials on stranded core wires, thus obtaining markedly practicable flame-retardant electrical wires and cables.

What is claimed is:

1. A halogen-free flame-retardant resin composition having a specific gravity of not more than 1.14, comprising:

100 parts by weight of a polyolefin resin (A);

not less than 5 parts by weight and less than 50 parts by weight of a hydrated inorganic compound (B); and not less than 1 part by weight and not more than 55 parts by weight of an auxiliary flame retardant (C) having an action of forming a char-like thermally insulating layer on combustion and/or an action of foaming at high temperature thereby to entrap water vapor, wherein said constituents comprising (A), (B) and (C) are mixed at a mixing ratio determined such that the specific gravity of the halogen-free flame-retardant resin composition does not exceed 1.14.

2. The halogen-free flame-retardant resin composition according to claim 1, wherein the hydrated inorganic compound is magnesium hydroxide and/or aluminum hydroxide.

3. The halogen-free flame-retardant resin composition according to claim 1, wherein the specific gravity of the auxiliary flame retardant (C) is 1.5 g/cm$^3$ or less.

4. The halogen-free flame-retardant resin composition according to claim 1, wherein the auxiliary flame retardant is a silicone compound.

5. The halogen-free flame-retardant resin composition according to claim 1, wherein not less than 0.5 parts by weight and not more than 2.5 parts by weight of red phosphorous (c1) and not less than 1 part by weight and not more than 6 parts by weight of carbon black (c2) are added as the auxiliary flame retardant (C) to 100 parts by weight of the polyolefin resin (A), wherein red phosphorous and the carbon black is added to the auxiliary flame retardant at a ratio such that the specific gravity of the halogen-free flame-retardant resin composition does not exceed 1.14.

6. The halogen-free flame-retardant resin composition according to claim 1, wherein the polyolefine resin contains at least one selected from the group consisting of ethylene-vinyl acetate copolymer, ethylene-ethyl acrylate copolymer and ethylene-propylene rubber.

7. The halogen-free flame-retardant resin composition according to claim 1, further comprising a molybdenum compound (d1) in an amount not less than 5 parts by weight and not more than 20 parts by weight based on 100 parts by weight of the polyolefin resin (A) and the amount is determined such that the specific gravity of the halogen-free flame-retardant resin composition does not exceed 1.14.

8. The halogen-free flame-retardant resin composition according to claim 1, wherein an antioxidant (d2) is further added in an amount not less than 0.1 parts by weight a and not more than 2.0 parts by weight based on 100 parts by weight of the polyolefin resin and the amount is determined such that the specific gravity of the halogen-free flame-retardant resin composition does not exceed 1.14.

9. The halogen-free flame-retardant resin composition according to claim 1, comprising: a polyolefin resin (A), a hydrated inorganic compound (B); and an auxiliary flame retardant (C), wherein said constituents comprising (A), (B) and (C) of the halogen-free flame-retardant resin composition are mixed at a mixing ratio determined such that the specific gravity of the halogen-free flame-retardant resin composition does not exceed 1.14, and wherein the content of a heavy metal in the halogen-free flame-retardant resin composition is less than 0.1% by weight.

* * * * *